US011080762B1

(12) United States Patent
Amini et al.

(10) Patent No.: US 11,080,762 B1
(45) Date of Patent: Aug. 3, 2021

(54) CONTENT ITEM AUCTION BIDDING

(71) Applicant: Google LLC, Mountain View, CA (US)

(72) Inventors: Ali Nasiri Amini, Redwood City, CA (US); Ardian Poernomo, Santa Clara, CA (US); Alireza Darvish, Santa Clara, CA (US); Alok Aggarwal, Foster City, CA (US); Eu-Jin Goh, Palo Alto, CA (US); Oren E. Zamir, Los Altos, CA (US); Qing Xu, San Jose, CA (US)

(73) Assignee: Google LLC, Mountain View, CA (US)

( * ) Notice: Subject to any disclaimer, the term of this patent is extended or adjusted under 35 U.S.C. 154(b) by 343 days.

(21) Appl. No.: 15/211,240

(22) Filed: Jul. 15, 2016

Related U.S. Application Data

(63) Continuation of application No. 13/687,321, filed on Nov. 28, 2012, now abandoned.

(51) Int. Cl.
*G06Q 30/00* (2012.01)
*G06Q 30/02* (2012.01)
*G06F 16/22* (2019.01)

(52) U.S. Cl.
CPC ..... *G06Q 30/0275* (2013.01); *G06F 16/2228* (2019.01); *G06Q 30/0201* (2013.01)

(58) Field of Classification Search
CPC ............................... G06Q 10/00; G06Q 30/00
See application file for complete search history.

(56) References Cited

U.S. PATENT DOCUMENTS

| | | | | |
|---|---|---|---|---|
| 8,719,082 B1 * | 5/2014 | Snyder | ............... | G06Q 30/0275 705/14.1 |
| 9,697,500 B2 * | 7/2017 | Tumanov | ............. | G06Q 10/109 |
| 2002/0004855 A1 * | 1/2002 | Cox | ........................ | H04L 29/06 719/328 |
| 2004/0158536 A1 | 8/2004 | Kowal et al. | | |
| 2006/0253328 A1 * | 11/2006 | Kohli | ................. | G06Q 30/0269 705/14.53 |
| 2010/0042507 A1 | 2/2010 | Pritchard et al. | | |
| 2010/0217660 A1 * | 8/2010 | Biswas | .................. | G06Q 30/02 705/14.38 |

(Continued)

OTHER PUBLICATIONS

Rastegari et al., Web Search Personalization Based on Browsing History by Artificial Immune System, Nov. 2010, ICSRC Publication, vol. 2, No. 3, pp. 281-301 (Year: 2010).*

*Primary Examiner* — Naresh Vig
(74) *Attorney, Agent, or Firm* — Fish & Richardson P.C.

(57) ABSTRACT

Methods, systems, and apparatus for content item auction bidding. In one aspect, a method includes receiving a request for a content item, the request including request feature values and a device identifier, the device identifier being included in a remarketing list; obtaining a predicted performance measure for a remarketing content item associated with the remarketing list based on a first timestamp and a second timestamp, the first timestamp being included in the remarketing list and associated with the device identifier included in the request, and the second timestamp being for the request; determining a bid adjustment value based on the first timestamp and the second timestamp; obtaining a remarketing bid for the remarketing content item, the remarketing bid specifying an amount a content item provider is willing to pay for distribution of the remarketing content item; and adjusting the remarketing bid based on the bid adjustment value.

19 Claims, 5 Drawing Sheets

(56) References Cited

U.S. PATENT DOCUMENTS

| | | |
|---|---|---|
| 2011/0231264 A1 | 9/2011 | Dilling et al. |
| 2011/0246267 A1 | 10/2011 | Williams et al. |
| 2011/0246310 A1 | 10/2011 | Buchalter et al. |
| 2011/0258038 A1 | 10/2011 | Loffe et al. |
| 2012/0023457 A1* | 1/2012 | Lai ............... G06Q 30/0251 715/863 |
| 2012/0041816 A1 | 2/2012 | Buchalter |
| 2012/0271715 A1* | 10/2012 | Morton .......... G06Q 30/0257 705/14.53 |
| 2014/0129325 A1* | 5/2014 | Zinger ............ G06Q 30/0241 705/14.46 |
| 2014/0136313 A1* | 5/2014 | Shaw ............. G06Q 30/0242 705/14.41 |

* cited by examiner

CONTENT ITEM AUCTION BIDDING

CROSS-REFERENCE TO RELATED APPLICATIONS

This application is a continuation application of and claims priority to U.S. application Ser. No. 13/687,321, filed on Nov. 28, 2012, the entire contents of which are hereby incorporated by reference.

BACKGROUND

This specification relates to content item auction bidding.

The Internet provides access to a wide variety of resources, for example, webpages, images, audio files, and videos. Such access to these resources has likewise enabled opportunities for providing relevant additional content. One example of additional content is advertisements. For example, resources of particular interest to a user can be identified by a search engine in response to a user query. By comparing the user query to a list of keywords specified by an advertiser, it is possible to provide relevant advertisements (or other content items) to the user with search results.

Another way to distribute content items to users is remarketing, which allows content item providers to choose particular content items to be shown to users who have performed certain actions, such as visiting a web page of the content item provider. For example, an advertiser can choose a particular advertisement to be provided to users who have recently visited the advertiser's website. As these users are likely interested in the advertiser's offerings, they are likely to be interested in the advertised product or service.

Often, multiple content item providers compete to have their content items provided to users. For example, advertisers may set bids for particular advertisements, and advertisement auctions may be conducted, where the advertisements of the winning bidders are provided to users.

SUMMARY

This specification describes technologies relating to content item auction bidding.

In general, one innovative aspect of the subject matter described in this specification can be embodied in methods that include the actions of receiving a request for a content item, the request including request data describing one or more request feature values and data indicating a device identifier, the device identifier being included in a remarketing list that associates timestamps with device identifiers of user devices that have performed one or more actions to be included in the remarketing list; obtaining a predicted performance measure for a remarketing content item associated with the remarketing list based on a first timestamp and a second timestamp, the first timestamp being included in the remarketing list and associated with the device identifier included in the request, and the second timestamp being for the request; determining a bid adjustment value based, at least in part, on the first timestamp and the second timestamp; obtaining a remarketing bid for the remarketing content item, the remarketing bid specifying an amount a content item provider associated with the remarketing list is willing to pay for distribution of the remarketing content item; and adjusting the remarketing bid based on the bid adjustment value. Other embodiments of this aspect include corresponding systems, apparatus, and computer programs, configured to perform the actions of the methods, encoded on computer storage devices.

These and other embodiments can each optionally include one or more of the following features.

Determining the bid adjustment value may comprise: accessing data specifying bins associated with the remarketing list, each bin corresponding to a unique combination of remarketing signal values, and each bin having a corresponding predicted performance measure and bid adjustment value; selecting one of the bins based on a comparison of the remarketing signal values of the bins to request feature values described by the request data and the first and second timestamps; and determining that the bid adjustment value for the remarketing content item is the bid adjustment value of the selected bin.

Each bin of the remarketing list may be ranked according to the predicted performance measure for the bin relative to the predicted performance measure of each other bin of the remarketing list; and the bid adjustment value of the selected bin may be based on a rank of the selected bin and a rank limit that specifies a particular rank of one of the bins of the remarketing list.

The bid adjustment value for the selected bin may be equal to unity when the selected bin is of a rank that is equal to or higher than the rank limit.

The bid adjustment value for the selected bin may be proportional to a ratio of the performance measure of the selected bin to the performance measure of the bin having a rank equal to the rank limit when the selected bin is of a rank that is less than the rank limit. The ratio is raised to a power value.

The rank limit and the power value for a remarketing list may be determined by: obtaining historical auction data for the remarketing list, the historical auction data including bid history and auction results associated with content item auctions in which a remarketing bid was considered; and iteratively adjusting the respective values of the rank limit and the power value during auction simulations based on the historical auction data to maximize a performance cost function.

The performance cost function may be based on: a conversion volume change relative to historical data based on scaling a max bid by a bid adjustment value for an auction simulation; and a unit of performance per unit of cost change relative to historical data based on scaling the max bid by the bid adjustment value for the auction simulation.

The performance cost function may be a multiple of the conversion volume change summed with the unit of performance per unit of cost change. One of the remarketing signals may comprise the difference between the first timestamp and second timestamp.

Particular embodiments of the subject matter described in this specification can be implemented so as to realize one or more of the following advantages. Remarketing helps content item providers identify opportunities to provide content items to users who have already expressed an interest in products or services the content item providers offer. Selectively adjusting bids for remarketing content items may lead to a better return on investment for content item providers. Users, in turn, are provided with content items that are likely to be of interest the user.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Content item providers, such as advertisers, may run campaigns designed to provide customized content items to users who have expressed interest in the content item provider's products or services. The systems and methods disclosed herein adjust bids for remarketing content items.

A request for a content item may be received from a user device. The request includes a device identifier that is included in a remarketing list that associates timestamps with device identifiers of users that have performed one or more actions to be included in the remarketing list. For example, a device identifier may have been added to the list when a corresponding user device requests a web page of an Internet retailer. The timestamp indicates the time that the device identifier was added to the list—e.g., the time that the user device requested the web page.

A predicted performance measure, such as a predicted conversion rate, may be obtained for remarketing content item associated with the remarketing list. The remarketing content item may be an advertisement that is intended for distribution to user devices that have device identifiers on the remarketing list. The predicted performance measure is based on the timestamp included in the remarketing list and a second timestamp that represents the time request was sent or received. For example, a predicted conversion rate may be relatively high if only a short amount of time has elapsed since the device identifier was added to the remarketing list. On the other hand, if a significant amount of time has elapsed since the device identifier was added to the remarketing list, the predicted conversion rate may be relatively low.

Based on the predicted performance measure, a bid adjustment value is determined. The bid adjustment value may be used to adjust a bid associated with the remarketing content item. In some implementations, the bid adjustment value has a maximum value of unity. For example, if the predicted conversion rate is relatively high, the remarketing bid adjustment value may be near unity, whereas a lower predicted conversion rate may cause the bid adjustment value to approach a lower threshold, such as 0. The bids that are adjusted by the bid adjustment values may be used by a content item auctioneer to determine which content item(s) will be provided in response to the content item request.

These features and other features are described in more detail below.

Example Environment

Figure 1A:
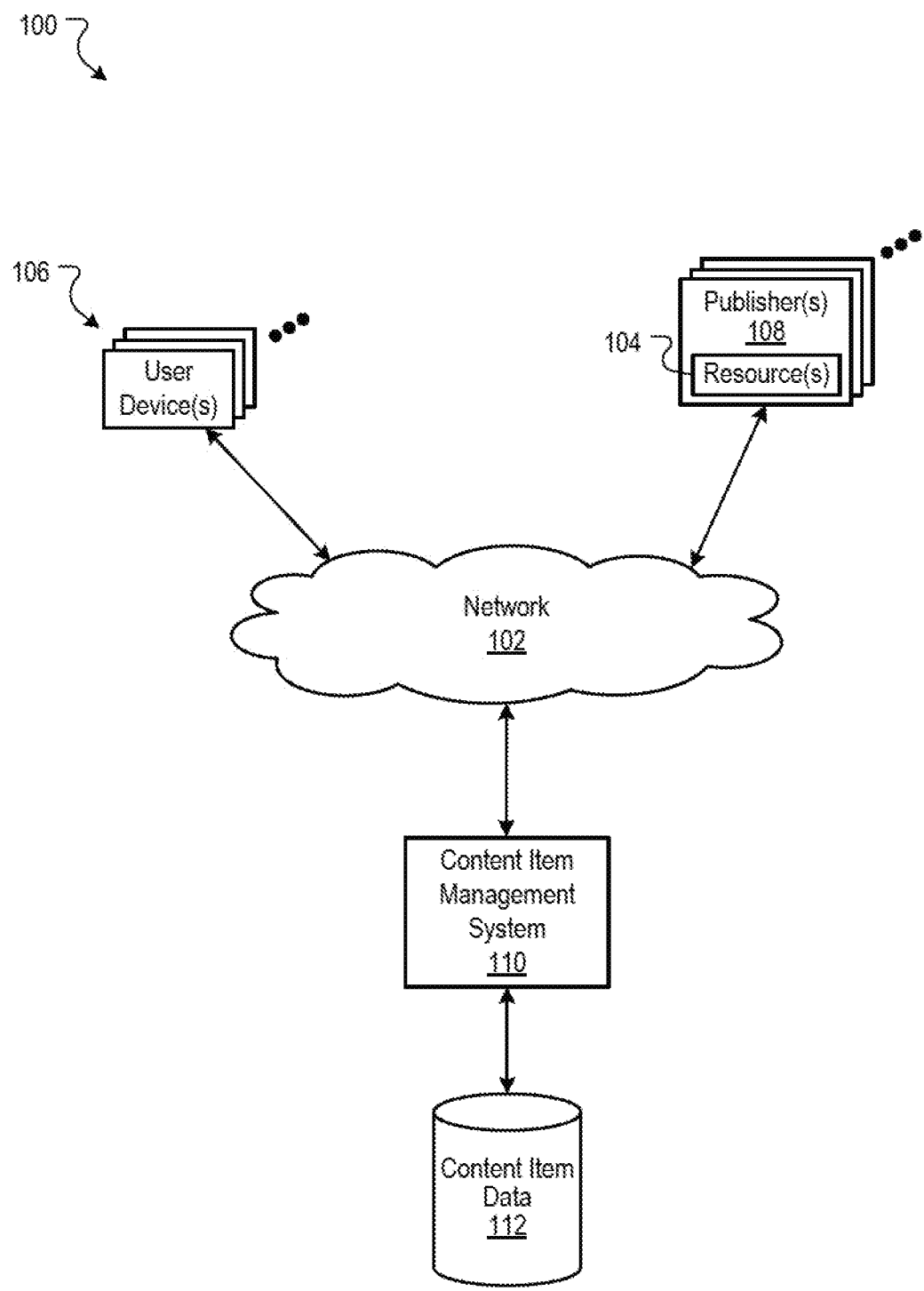
FIG. 1A is a block diagram of an example environment in which content item auction bidding occurs.

FIG. 1A is a block diagram of an example environment 100 in which content item auction bidding occurs. A computer network 102, such as a local area network (LAN), wide area network (WAN), the Internet, or a combination thereof, connects publisher resources 104, user devices 106, publishers 108, and a content item management system 110. The online environment 100 may include many thousands of publishers 108, resources 104, and user devices 106.

Figure 1B:
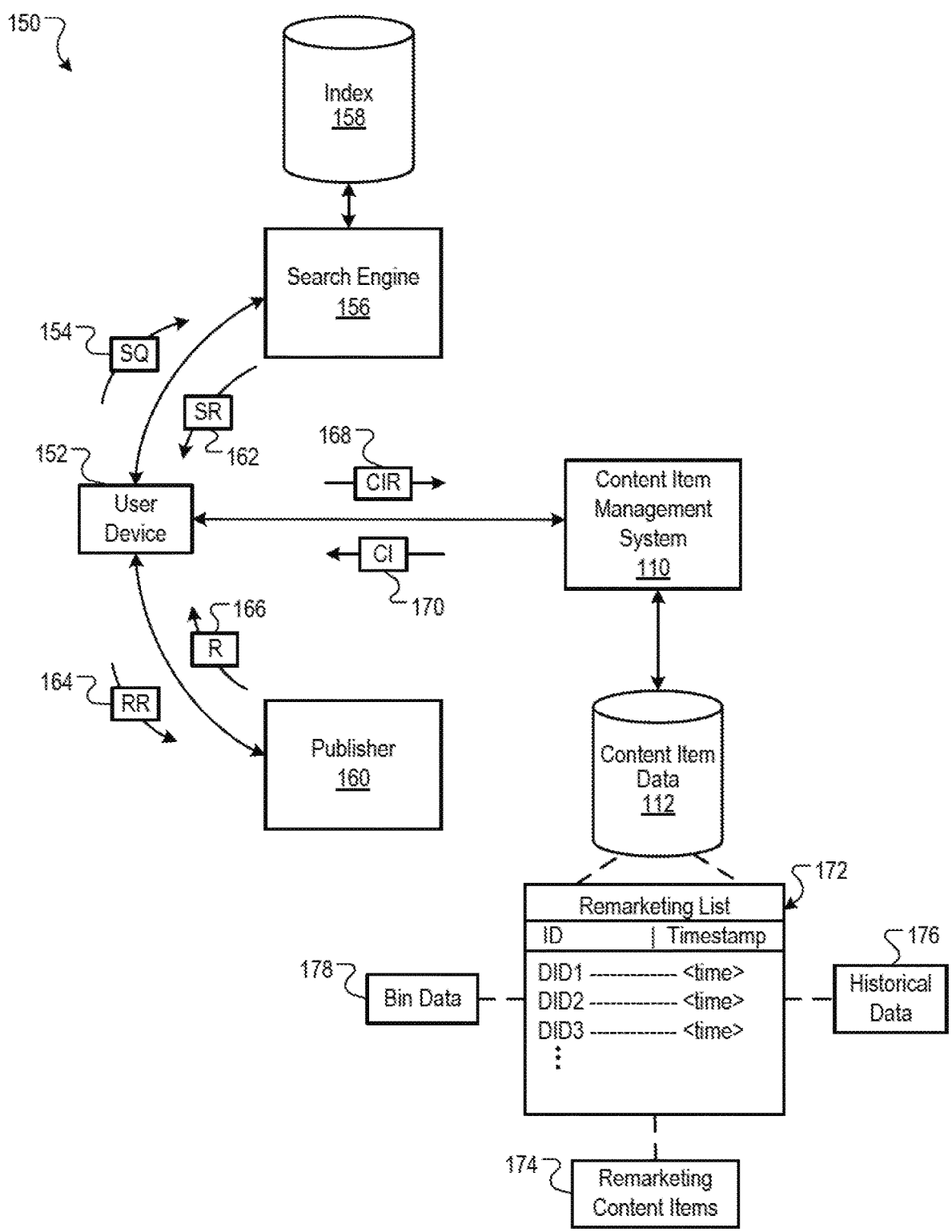
FIG. 1B is a block diagram of an example data flow that represents a content item auction bidding process.

FIG. 1B is a block diagram of an example data flow 150 that represents a content item auction process which may be performed in the example environment 100. In particular, the example data flow 150 is a representation of the process by which a remarketing content item is selected and provided to a particular user device 152. Reference is made to both FIGS. 1A and 1B in the following description.

A resource 104 is any data that can be provided by a publisher 108 over the network 102 and that is associated with a resource address. Resources include HTML pages, word processing documents, and portable document format (PDF) documents, images, video, and feed sources, to name just a few. The resources may be included in a web site hosted by a publisher 108, such as publisher 160, and the resources can include content, such as words, phrases, pictures, and so on, and may include embedded information (such as meta information and hyperlinks) and/or embedded instructions (such as scripts).

A user device 106 is an electronic device that is under the control of a user and is capable of requesting and receiving resources 104 over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the world wide web or a local area network.

The content item management system 110 facilitates the provisioning of content items, such as advertisements, with the resources 104. In particular, the content item management system 110 allows content item providers to define selection rules that take into account attributes associated with user devices to provide specific content items for users. Example selection rules include keyword-based selection, in which advertisers provide bids for keywords that are present in either search queries or resource content, and remarketing list based selection, in which advertisers provide bids for advertisements that will be provided to user devices that have a device identifier that is on the advertiser's remarketing list. For example, remarketing content items that are associated with a remarketing list may have bids associated with them. The content item management system 110, in response to receiving a content item request from a user device, selects content items to be provided to the requesting user device and displayed in content item slots of a resource.

Content items can be provided for many different resources 106, such as the resources of the publishers and on a search results page resource. For example, a resource may include instructions that cause the user device to request content items from the content item management system 110. The request may include, for example, a publisher identifier, a device identifier, and, optionally, keyword identifiers related to the content of the resource. The content item management system 110, in turn, provides content items to the particular user device.

In particular, the content item management system 110, in response to each request for content items, conducts an auction to select content items to be provided in response to the request. The content items may be ranked according to a score that, in some implementations, is proportional to a value based on a content item bid and one or more parameters specified in the content item data 112. The highest ranked content items resulting from the auction are selected and provided to the requesting user device.

For example, the user device 152 may send a search query 154 to a search engine 156. In response to receiving the search query 154, the search engine 156 uses the index 158 to identify resources that are relevant to the search query 154. The search engine 156 identifies the resources in the form of search results and returns the search results to the user device 152 in search results page resource 162. In another example, the user device 152 may send a resource request 164 to a publisher 160. In response to receiving the resource request 164, the publisher 160 provides the user device 152 with the requested resource 166. The search results page resource 162 and/or requested resource 166 may include instructions that cause the user device 152 to send a content item request 168 to the content item management system 110. In response to receiving the content item request 168, the content item management system 110 provides a content item 170 to the user device 152.

The content item management system 110 includes a data storage system that stores content item data 112. The content item data 112 stores content items, selection information, remarketing information, and budgeting information for content item providers. For example, the content item data 112 may include remarketing lists, such as remarketing list 172. In the example environment 150, the remarketing list 172 includes device identifiers of devices that performed a certain action or actions on a publisher's web page and timestamps of when the identifiers were added to the list. For example, a device identifier may be added to a remarketing list when a user device associated with the identifier visits a particular web page of the publisher 160, or if the user device submitted a particular keyword in a search query sent to the search engine 156.

The remarketing list 172 is associated with remarketing content items 174 that the owner of the remarketing list 172 has designated to be provided to devices having device identifiers that are on the remarketing list 172. For example, the remarketing list 172 may belong to the publisher 160. When the resource request 164 was received by the publisher 160, the publisher may have caused the device identifier of the user device 152 to be added to the publisher's remarketing list 172. The publisher 160 may wish to provide particular content items—e.g., the remarketing content items 172—to users who have requested particular resources of the publisher 160.

The remarketing list 172 is also associated with historical data 176 that stores historical remarketing content item data. For example, the historical data 176 may include historical auction data that indicates the performance of the remarketing content items 174 with respect to content item auctions, e.g., remarketing content item bids for previous auctions, bids of competing content items, results of previous auctions, and characteristics of the user device from which a content item request was received.

Remarketing Bid Adjustment

Generally, a remarketing content item bid associated with a remarketing content item is used by the content item management system 110 during a content item auction. As discussed below, the content item management system 110 may adjust the remarketing content item bids. The content item management system 110, in some implementations, uses bid adjustment data to adjust the bids of content items that are provided for requests related to remarketing. Use of bid adjustment data is described in this section, and the generation of the bid adjustment data is described in the following section.

In some implementations, the bid adjustment data is sorted into bins as defined by bin data 178. Bin data 178 associated with the remarketing list 172 may include data that specifies bins that each correspond to a unique combination of remarketing signal values. Each content item request associated with a device identifier included in the remarketing list will correspond to a bin included in the bin data for the remarketing list. For example, a unique combination of remarketing signal values for a particular bin may specify a time period less than 1 hour and a user device platform of desktop computer. The particular bin corresponds to any content item request that was received from a user device that is a desktop computer if the request was received less than 1 hour after the device identifier of the requesting user device was added to the remarketing list.

In some implementations, each bin specified by the bin data 178 has a corresponding predicted performance measure, such as a predicted click through rate or a predicted conversion rate. A predicted click-through rate (pCTR) may represent an estimated rate at which a user device presented with a particular content item will select, or "click," the content item. A predicted conversion rate (pCVR) may represent an estimated rate at which a user device presented with a particular content item will perform an action specified by the content item provider, e.g., register at the content item provider's website or purchase a particular product from the content item provider. Predicted performance measures may be generated by the content item management system or obtained from a separate system. In some implementations, the predicted performance measures are generated based on the historical data 176.

Each bin specified by the bin data 178 may also correspond to a bid adjustment value (BAV). The BAV may be used by the content item management system 110 to adjust a remarketing bid associated with one of the remarketing content items 174 during a content item auction. For example, given a BAV of 0.9, if a remarketing advertisement has a remarketing bid of $1.00, that bid may be adjusted by multiplying it by the BAV, resulting in a bid of $0.90. The BAV for a particular bin may be calculated, for example, based on the predicted performance measure corresponding to the particular bin. Calculation of the BAV for each bin will be discussed in further detail in the following section.

The bin data 178 may include other information associated with remarketing content items 174, such as performance measures associated with each bin. An example table depicting bin data for a remarketing list is provided in Table 1 below.

TABLE 1

| Rank | Bin Values | pCVR | Conversions | Cum. Conversions | BAV |
|---|---|---|---|---|---|
| 1 | {T < 1 hour, mobile} | 0.9 | 9 | 9 | 1 |
| 2 | {T < 1 hour, desktop} | 0.8 | 4 | 13 | 1 |
| 3 | {T ≥ 1 hour, desktop} | 0.7 | 7 | 20 | 0.7/0.8 = 0.875 |
| 4 | {T ≥ 1 hour, mobile} | 0.6 | 3 | 23 | 0.6/0.8 = 0.75 |

The bin data depicted in Table 1 shows four combinations of remarketing signal values, a pCVR for each bin, and a BAV for each bin. In addition, Table 1 includes a number of conversions and a cumulative number of conversions for each bin, and the bins are ranked according to their pCVR. The number of conversions for each bin is based on historical data for remarketing content items that correspond to the remarketing list to which the bin data corresponds. The number of conversions for a bin indicates how many conversions occurred as a result of providing corresponding remarketing content items to user devices having request data that corresponds to the bin's remarketing signal values. The number of cumulative conversions for each bin represents the conversions of the particular bin, plus the conversions of each bin ranked above the particular bin.

For example, the first row of Table 1 is for a bin associated with a time period less than 1 hour and a mobile platform. A user device associated with a content item request corresponds to the first bin if two criteria are met. First, the difference between a) the timestamp corresponding to the user device in the remarketing list, and b) a timestamp that corresponds to a time the content item request was received by the content item management system, must be less than 1 hour. Second, the request data included in the content item request from the user device must indicate that the user device is associated with a mobile platform, e.g., a mobile phone or mobile tablet computer.

By way of example, assume Table 1 represents the bin data 178 in the example environment 150, and assume that the user device 152 is a desktop computer. If the content item request 168 is received less than 1 hour after the device identifier of the user device 152 was added to the remarketing list 172, the request would correspond to the second bin {T<1 hour, desktop}, the pCVR of one of the remarketing content items 174 would be 0.8, and the BAV used to adjust a bid for one of the remarketing content items 174 would 1. If, on the other hand, the content item request 168 is received more than one hour after the device identifier of the user device 152 was added to the remarketing list 172, the request would correspond to the third bin {T≥1 hour, desktop}, the pCVR of one of the remarketing content items 174 would be 0.7, and the BAV used to adjust a bid for one of the remarketing content items 174 would be 0.875. As discussed above, the BAV may be used to adjust a bid associated with a remarketing content item 174 during an auction conducted by the content item management system 110. The adjustment of remarketing content item bids is further discussed below with respect to FIG. 2.

Figure 2:
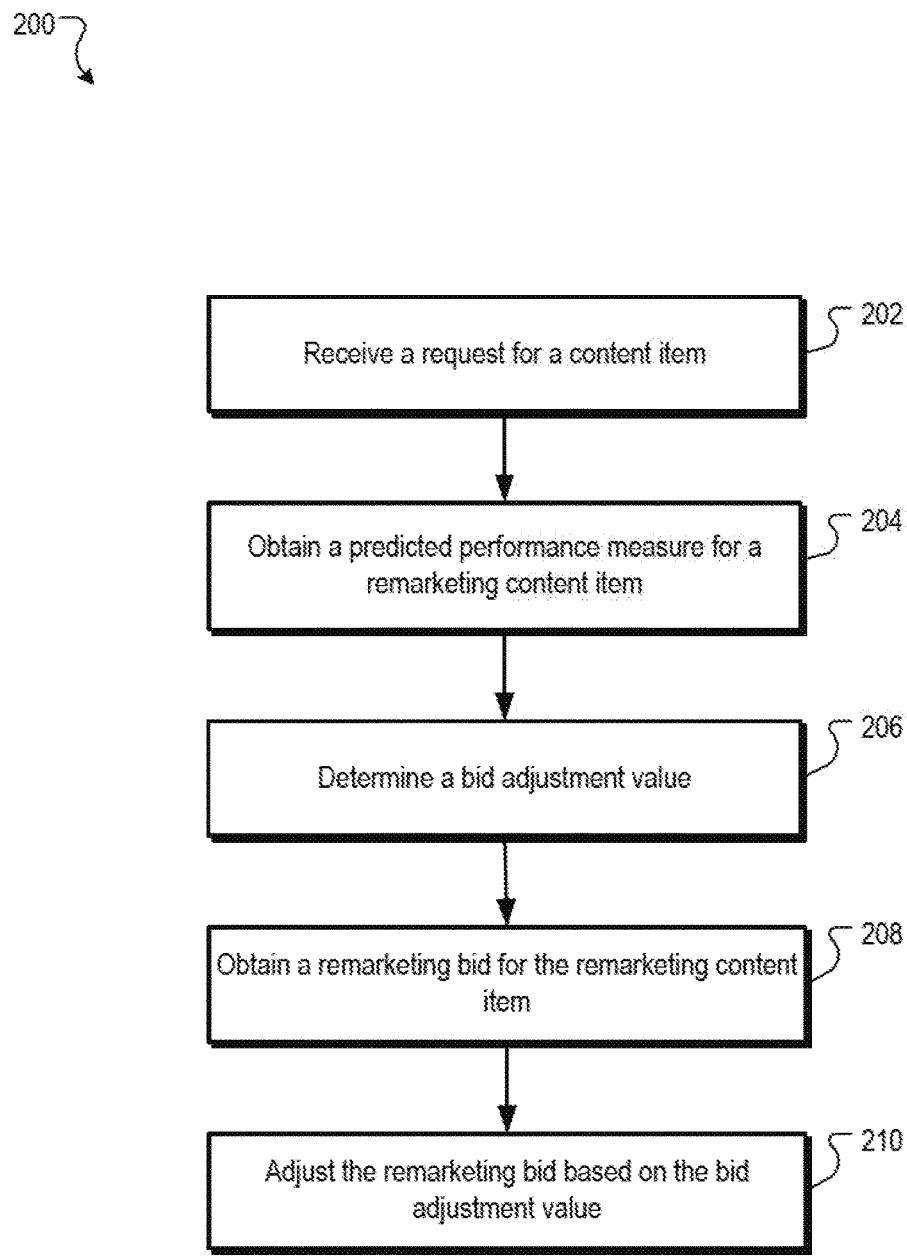
FIG. 2 is a flow diagram of an example process for performing a content item auction bid adjustment.

FIG. 2 is a flow diagram of an example process 200 for performing a content item auction bid adjustment. The process 200 may be used by a data processing apparatus that is used to realize the content item management system.

The process 200 receives a request for a content item (202). The request includes request data describing one or more request feature values and data indicating a device identifier. The device identifier is included in a remarketing list that associates timestamps with device identifiers of users that have performed one or more actions to be included in the remarketing list. For example, the device identifier may have been added to the remarketing list as a result of the corresponding user device visiting a web page of a publisher that controls the remarketing list.

In some implementations, the request feature values include a browser platform for the user device. The browser platform indicates, for example, the type of user device, e.g., a mobile phone, a desktop computer, or a tablet computer. Other request feature values include, for example, data identifying a resource with which the requested content item is to be displayed.

The process 200 obtains a predicted performance measure for a remarketing content item (204). The remarketing content item is a content item associated with the remarketing list that includes the device identifier of the user device that submitted the content item request. The predicted performance measure is based at least in part on a first and second timestamp. The first timestamp is included in the remarketing list and associated with the device identifier. For example, the first timestamp may be the time that the device identifier was added to the remarketing list. The second timestamp is for the content item request. For example, the second timestamp may be the time that the content item request is received.

In some implementations, the predicted performance measure is pre-calculated based on bins that correspond to content item requests. For example, a remarketing list may have three bins, one for content item requests received less than 1 hour after being added to the remarketing list, one for content item requests received less than 1 day after being added to the remarketing list, and one for content item requests received more than 1 day after being added to the remarketing list. Historical data associated with the remarketing list may be used to predict the performance of remarketing content items provided for requests that correspond to each of the bins.

The process 200 determines a bid adjustment value (206). The bid adjustment value is based at least in part on the first and second timestamps. For example, the bid adjustment value may be based on the difference between the first and second timestamps.

In some implementations, the process 200 determines the bid adjustment value for a remarketing content item by accessing data that specifies bins associated with the corresponding remarketing list, where each bin has a corresponding predicted performance measure and a bid adjustment value. The process 200 selects one of the bins and determines that the bid adjustment value of the remarketing content item is the bid adjustment value of the selected bin. In some implementations, each bin corresponds to a period of time, and the process 200 selects a bin based on a comparison of the bins' period of time to the first and second timestamps. In some implementations, each bin corresponds to a combination of remarketing signal values, and the process 200 selects a bin based on a comparison of the remarketing signal values of the bins to request feature values described by the request data and the first and second timestamps.

In some implementations, each bin of the remarketing list is ranked according to the predicted performance measure for the bin relative to the predicted performance measure of each other bin of the remarketing list, and the bid adjustment value of the selected bin is based on the rank of the selected bin and a rank limit that specifies a particular rank of one of the bins. For example, the bid adjustment value for the selected bin may be unity when the selected bin is of a rank that is equal to or higher than the rank limit.

In some implementations, the bid adjustment value for the selected bin is proportional to a ratio of the performance measure of the selected bin to the performance measure of one of the other bins of the remarketing list. The other bin may be the bin having a rank equal to the rank limit when the selected bin is of a rank limit that is less than the rank limit. In some implementations, the rank limit is a performance volume threshold, and the bid adjustment value for the selected bin is proportional to a ratio of the performance measure of the selected bin to the performance measure of the bin at or just above the performance volume threshold.

In some implementations, the ratio is raised to a power value. For example, the ratio of the performance measure of the selected bin to the performance measure of the bin having a rank equal to the rank limit may be raised to a power of 0.5 to increase the bid adjustment value, or raised to a power of 1.5 to decrease the bid adjustment value.

Determination of rank limits and power values is discussed in further detail in the following section.

The process 200 obtains a remarketing bid for the remarketing content item (208). The remarketing bid specifies an amount a content item provider associated with the remarketing list is willing to pay for distribution of the remarketing content item. For example, an advertiser may specify a $1.00 bid for a remarketing content item associated with the remarketing list.

The process 200 adjusts the remarketing bid based on the bid adjustment value (210). In some implementations, the remarketing bid is multiplied by the bid adjustment value. For example, if a bid adjustment value is 0.75, a $1.00 remarketing bid will be reduced to $0.75. The remarketing bid may be used in a content item auction to determine which content item(s) will be provided to a user device in response to the content item request.

Determining Rank Limit and Power Value for Bid Adjustment Values

As discussed above, the BAV of a particular bin may be based on a rank of the bin with respect to the rank of other bins that belong to the same remarketing list. For example, each bin associated with a remarketing list may be ranked based on the bin's corresponding pCVR. In some implementations, the BAV for a bin that is above a rank limit may be a particular value, e.g., unity, while the BAV for a bin below the rank limit may be proportional to a ratio of the performance measure of the bin to the performance measure of the first bin having a rank at or above the rank limit. For example, if the rank limit is 2, the two bins with the highest pCVR will have a BAV of unity. The BAV of each bin ranked third and below is proportional to a ratio of the pCVR of the bin to the performance measure of the bin with the second highest pCVR, e.g., the bin at rank 2. This is shown in Table 1, where the pCVR of the third ranked bin is the pCVR of the third ranked bin (0.7) divided by the pCVR of the second ranked bin (0.8).

In some implementations, the rank limit is a cumulative conversion threshold, such that the BAV of each bin whose cumulative conversion count is less than the cumulative conversion threshold will have a BAV of unity. For example, if the cumulative conversion threshold is 50%, each bin corresponding to a cumulative conversion count that is less than 50% of all conversions for the remarketing list will have a BAV of unity. On the other hand, each bin corresponding to a cumulative conversion count that is above 50% of all conversions for the remarketing list will have a BAV proportional to a ratio of the performance measure of the bin to the performance measure of the first bin having a cumulative conversion count below the cumulative conversion threshold. Calculation of the rank limit will be discussed in further detail below.

In some implementations, the ratio used to calculate the BAV may be raised to a power. The value of the exponent used—e.g., a "power value"—serves to either increase or decrease each BAV. For example, using a power value between 0 and 1 will increase the BAV, e.g., $0.875\textasciicircum 0.5=\sim 0.935$. Using a power value greater than 1 will decrease the BAV, e.g., $0.875\textasciicircum 1.5=\sim 0.818$. Example formulas for calculating BAV are provided below, as formula (1) and formula (2):

For a bin at rank n, where n is at or above the rank limit, L:

$$BAV(bin_n)=1; \quad (1)$$

For a bin at rank n, where n is below the rank limit, L:

$$BAV(bin_n)=(pCVR(bin_n)/pCVR(bin_L))^p \quad (2)$$

Where $pCVR(bin_n)$ is the predicted conversion rate corresponding to the bin at rank n;

$pCVR(bin_L)$ is the predicted conversion rate corresponding to the bin at the rank limit, L; and p is a power value for a remarking list.

In some implementations, the rank limit and power value for a remarketing list are determined by obtaining historical auction data for the remarketing list and iteratively adjusting the respective values of the rank limit and power value during auction simulations to maximize a performance cost function. The auction simulations may be based on the historical auction values. For example, for a given set of historical auction data, a rank limit and power value may be determined that, when used to calculate a BAV, maximize a performance cost function.

In some implementations, the performance cost function may be based on 1) a conversion volume change relative to historical data based on scaling a max bid by a BAV for an auction simulation, and 2) a unit of performance per unit of cost change relative to historical data based on scaling the max bid by the BAV for the auction simulation. For example, the conversion volume change may indicate a percent change in the number of conversions that would have resulted if historical auctions used a particular BAV. A unit of performance per unit of cost change may indicate a percentage change in the cost per conversion that would have resulted if historical auctions used a particular BAV. In some implementations, other metrics—in addition to or instead of the metrics above—could also be used in the performance cost function, such as CTR volume change.

An example performance cost function, shown as formula (3) below, is a multiple of the conversion volume change summed with the unit of performance per cost unit change.

$$m(CVC\ \%)+PPCC\ \%=\text{performance cost result} \quad (3)$$

Where m is a multiple;

CVC % is a percent change in conversion volume; and

PPCC % is a percent change in unit of performance per unit of cost.

Given a multiple of m=2, if a particular rank limit and power value used to generate a BAV, when applied to historical auction data, would result in 20% more conversions than the actual auction results, and would result in a 10% increase in the number of conversions per dollar, the performance cost function may result a value of 2(20)+10=50. The combination of rank limit and power value that maximizes the performance cost function may be selected as the rank limit and power value for the corresponding remarketing list. In some implementations, rank limits and power values may be determined independently for each remarketing list, while in other implementations, the same rank limit and/or power value may be used for multiple remarketing lists.

The BAV formulas (1) and (2) and the performance cost function (3) given above are examples, and other BAV formulas and performance cost functions may be used to calculate BAVs and determine a rank limit and power value used to determine BAVs. In addition, the particular remarketing signal values and ranges used in the example bins are examples. Other remarketing signal values and ranges of values may be used to create bins for various content item requests. For example, the time on a remarketing list may be broken into more specific time bins, such as T<1 minute, T<1 day, T<1 week, etc. Other remarketing signal values may include, for example, a quality score of the resource with which the remarketing content item is to be displayed, a measure of correlation between a topic of remarketing content item and a topic of the resource with which the remarketing content item is to be displayed, and the particular action that caused the device identifier of the user device to be added to the remarketing list.

Figure 3:
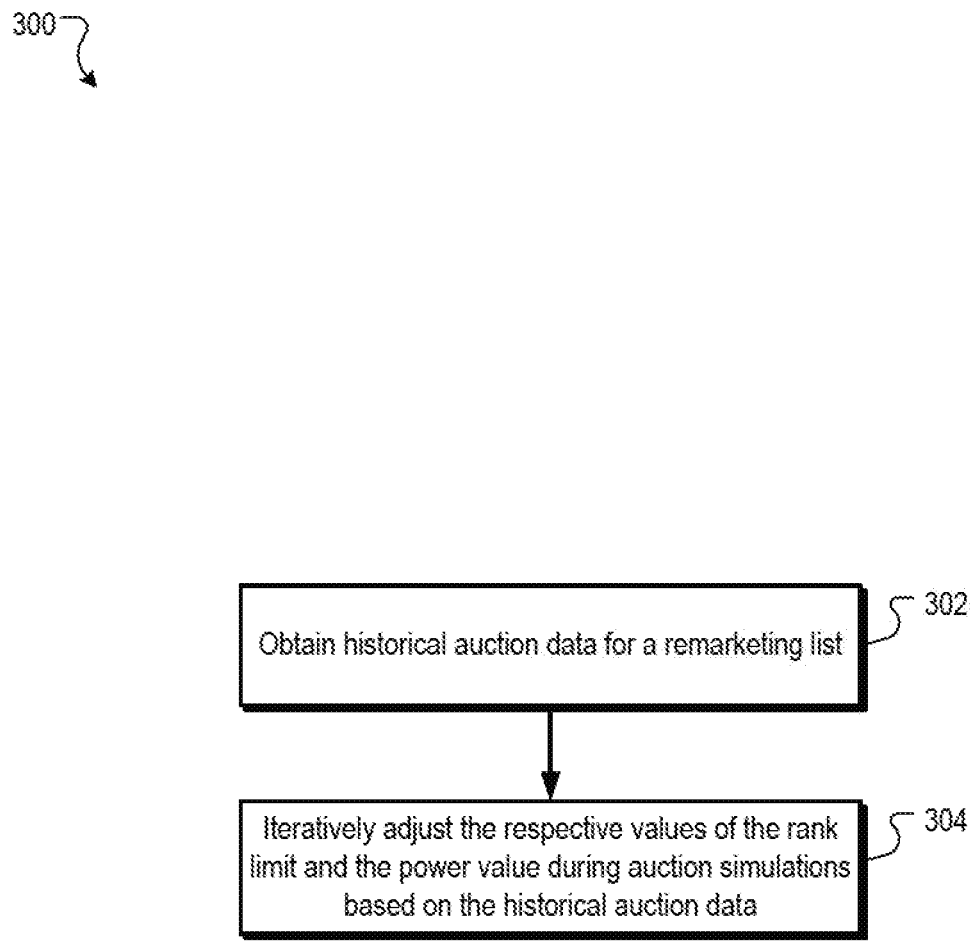
FIG. 3 is a flow diagram of an example process for determining a rank limit and power value for a remarketing list

FIG. 3 is a flow diagram of an example process 300 for determining a rank limit and power value for a remarketing list. The process 300 may be used by a data processing apparatus that is used to realize the content item management system.

The process 300 obtains historical auction data for a remarketing list (302). The historical auction data includes bid history and auction results associated with content item auctions in which a remarketing bid was considered.

The process 300 iteratively adjusts the respective values of the rank limit and the power value during auction simulations based on the historical auction data to maximize a performance cost function (304). In some implementations, the performance cost function is based on a conversion volume change relative to historical data and a unit of performance per unit of cost change relative to historical data. The conversion volume change and unit of performance per unit of cost change may be based on scaling a max bid by a bid adjustment value for an auction simulation. In some implementations, the performance cost function is a multiple of the conversion volume change summed with the unit of performance per unit of cost change.

Once a rank limit and power value have been determined for a remarketing list, the particular rank limit and power value may be used to determine BAVs for the bins associated with the remarketing list. As discussed above, these BAVs may be used to adjust remarketing bids that are used in a content item auction to determine which content item(s) will be provided to a user device in response to the content item request.

Example Data Processing Apparatus

Figure 4:
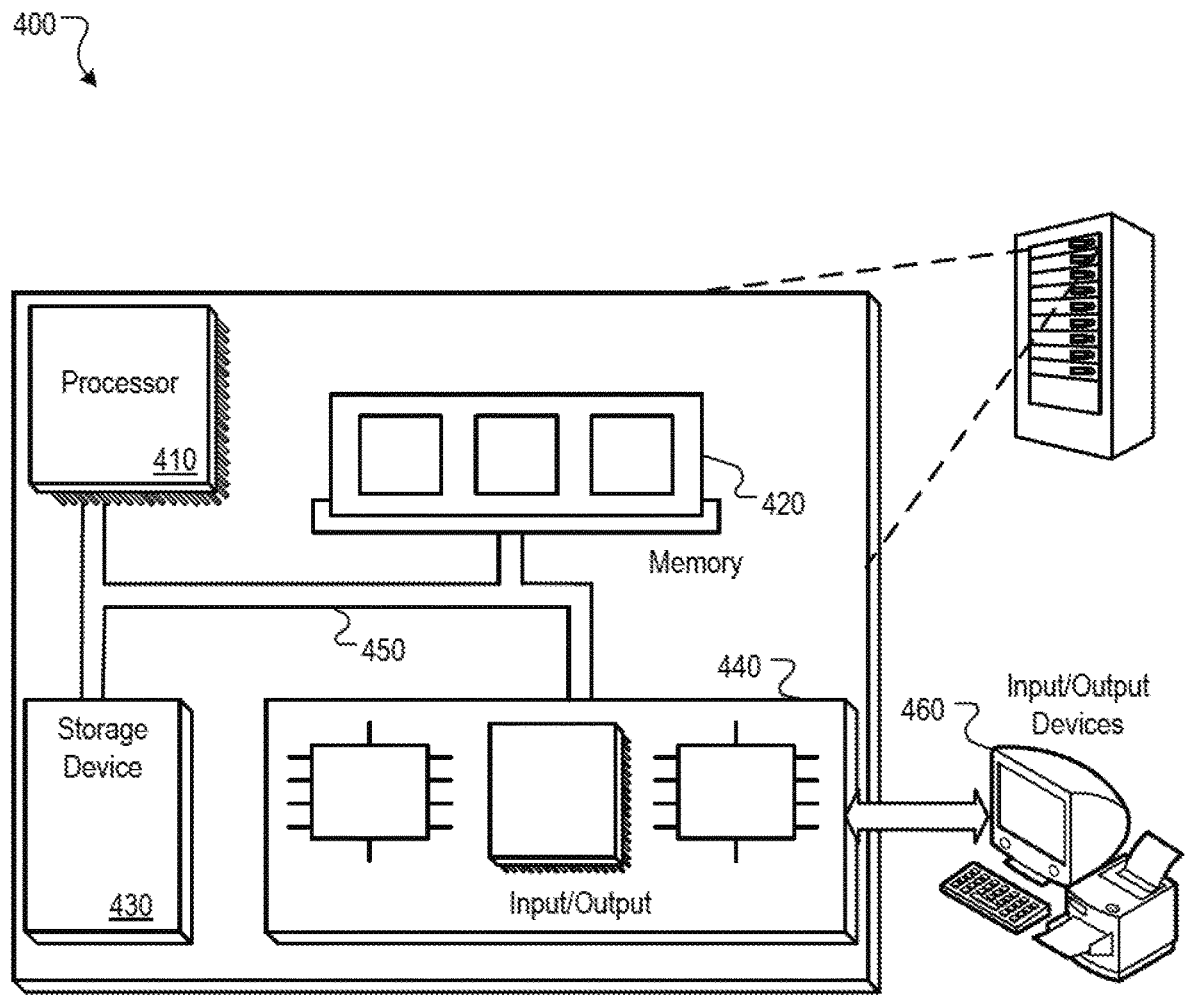
FIG. 4 is a block diagram of an example data processing apparatus.

FIG. 4 is a block diagram of an example data processing apparatus 400 that can be used to perform operations described above. The apparatus 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the apparatus 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the apparatus 400. In one implementation, the storage device 430 is a computer-readable medium. In various different implementations, the storage device 430 can include, for example, a hard disk device, an optical disk device, a storage device that is shared over a network by multiple computing devices, e.g., a cloud storage device, or some other large capacity storage device.

The input/output device 440 provides input/output operations for the apparatus 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example data processing apparatus has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a content management system including one or more servers, the method comprising:
   receiving, by the content management system, and from a given user device, a request for content for presentation within a resource currently being presented by the given user device at a given time, the request including data indicating a given device identifier for the given user device, the resource being accessed by the given user device from the Internet;

determining, by the content management system, that the given device identifier is included in a stored list of device identifiers that associates timestamps with device identifiers of user devices, wherein the timestamps specify when the user devices previously visited a particular web page other than the resource currently being presented, the particular web page having been previously provided to the user devices by a publisher system that is different from the content management system;

after the given user device has visited the particular web page and when the given user device presents the resource currently being presented, the resource being different from the particular web page that was visited, determining, by the content management system and based on a difference between (i) the given time at which the request for content for presentation within the resource currently being presented by the given user device was received and (ii) a timestamp that specifies when the given user device that is associated with the given device identifier in the stored list of device identifiers visited the particular web page, an amount of time that has elapsed since a time when the given user device visited the particular web page previously provided to the given user device by the publisher system;

adjusting, by the content management system, a value of a selection criterion that contributes to distribution of specified content to user devices that are referenced by the stored list of device identifiers, including decreasing the value of the selection criterion, thereby decreasing a likelihood that the specified content will be distributed in response to the request based on the amount of time that has elapsed since the time when the given user device visited the particular web page, wherein adjusting the value of the selection criterion comprises (i) accessing data specifying bins associated with the stored list of device identifiers, each bin corresponding to a unique combination of data values related to remarketing content items, and each bin having a corresponding pre-calculated predicted performance measure and bid adjustment value, (ii) selecting only one of the bins based at least in part on a comparison of the data values of the bins to the amount of time that has elapsed since the time when the given user device that is associated with the given device identifier visited the particular web page, and (iii) adjusting the value of the selection criterion that contributes to distribution of the specified content, based at least in part on the bid adjustment value of the selected bin;

selecting, by the content management system, the specified content for the given user device when the adjusted value of the selection criterion for the specified content is higher than selection criterion values of other content items, and selecting different content when the adjusted value of the selection criterion for the specified content is lower than the selection criterion values of other content items; and providing, by the content management system, in response to the request, the selected content to the given user device for presentation within the resource currently being presented by the given user device.

2. The method of claim 1, wherein:
each bin of the stored list is ranked according to the pre-calculated predicted performance measure for the bin relative to the pre-calculated predicted performance measure of each other bin of the stored list; and
the bid adjustment value of the selected bin is based on a rank of the selected bin and a rank limit that specifies a particular rank of one of the bins of the stored list.

3. The method of claim 2, wherein the bid adjustment value for the selected bin is equal to unity when the selected bin is of a rank that is equal to or higher than the rank limit.

4. The method of claim 3, wherein the bid adjustment value for the selected bin is proportional to a ratio of the pre-calculated predicted performance measure of the selected bin to the pre-calculated predicted performance measure of the bin having a rank equal to the rank limit when the selected bin is of a rank that is less than the rank limit.

5. The method of claim 4, wherein the ratio is raised to a power value.

6. The method of claim 5, wherein the rank limit and the power value for a given stored list are determined by:
obtaining historical auction data for the given stored list, the historical auction data including bid history and auction results associated with content auctions in which a given bid was considered; and
iteratively adjusting respective values of the rank limit and the power value during auction simulations based on the historical auction data to maximize a performance cost function.

7. The method of claim 6, wherein the performance cost function is based on:
a conversion volume change relative to historical data based on scaling a max bid by a bid adjustment value for an auction simulation; and
a unit of performance per unit of cost change relative to historical data based on scaling the max bid by the bid adjustment value for the auction simulation.

8. The method of claim 7, wherein the performance cost function is a multiple of the conversion volume change summed with the unit of performance per unit of cost change.

9. The method of claim 1, wherein one of the data values related to remarketing content items comprises the amount of time that has elapsed since the time when the given user device that is associated with the given device identifier visited the particular web page, and two or more of the bins are associated with different periods of time.

10. A content management system comprising:
one or more data processing devices; and
one or more data stores storing instructions that, when executed by the one or more data processing devices, cause the one or more data processing devices to perform operations comprising:
receiving, by the content management system, and from a given user device, a request for content for presentation within a resource currently being presented by the given user device at a given time, the request including data indicating a given device identifier for the given user device, the resource being accessed by the given user device from the Internet;
determining, by the content management system, that the given device identifier is included in a stored list of device identifiers that associates timestamps with device identifiers of user devices, wherein the timestamps specify when the user devices previously visited a particular web page other than the resource currently being presented, the particular web page having been previously provided to the user devices by a publisher system that is different from the content management system;

after the given user device has visited the particular web page and when the given user device presents the resource currently being presented, the resource being different from the particular web page that was visited, determining, by the content management system and based on a difference between (i) the given time at which the request for content for presentation within the resource currently being presented by the given user device was received and (ii) a timestamp that specifies when the given user device that is associated with the given device identifier in the stored list of device identifiers visited the particular web page, an amount of time that has elapsed since a time when the given user device visited the particular web page previously provided to the given user device by the publisher system;

adjusting, by the content management system, a value of a selection criterion that contributes to distribution of specified content to user devices that are referenced by the stored list of device identifiers, including decreasing the value of the selection criterion, thereby decreasing a likelihood that the specified content will be distributed in response to the request based on the amount of time that has elapsed since the time when the given user device visited the particular web page, wherein adjusting the value of the selection criterion comprises (i) accessing data specifying bins associated with the stored list of device identifiers, each bin corresponding to a unique combination of data values related to remarketing content items, and each bin having a corresponding pre-calculated predicted performance measure and bid adjustment value, (ii) selecting only one of the bins based at least in part on a comparison of the data values of the bins to the amount of time that has elapsed since the time when the given user device that is associated with the given device identifier visited the particular web page, and (iii) adjusting the value of the selection criterion that contributes to distribution of the specified content, based at least in part on the bid adjustment value of the selected bin;

selecting, by the content management system, the specified content for the given user device when the adjusted value of the selection criterion for the specified content is higher than selection criterion values of other content items, and selecting different content when the adjusted value of the selection criterion for the specified content is lower than the selection criterion values of other content items; and providing, by the content management system, in response to the request, the selected content to the given user device for presentation within the resource currently being presented by the given user device.

11. The method of claim 1, wherein one of the data values related to remarketing content items comprises a device type, and two or more of the bins are associated with different device types.

12. The content management system of claim 10, wherein:

each bin of the stored list is ranked according to the pre-calculated predicted performance measure for the bin relative to the pre-calculated predicted performance measure of each other bin of the stored list; and the bid adjustment value of the selected bin is based on a rank of the selected bin and a rank limit that specifies a particular rank of one of the bins of the stored list.

13. The content management system of claim 12, wherein the bid adjustment value for the selected bin is equal to unity when the selected bin is of a rank that is equal to or higher than the rank limit.

14. The content management system of claim 13, wherein the bid adjustment value for the selected bin is proportional to a ratio of the pre-calculated predicted performance measure of the selected bin to the pre-calculated predicted performance measure of the bin having a rank equal to the rank limit when the selected bin is of a rank that is less than the rank limit.

15. The content management system of claim 14, wherein the ratio is raised to a power value.

16. The content management system of claim 15, wherein the rank limit and the power value for a given stored list are determined by:

obtaining historical auction data for the given stored list, the historical auction data including bid history and auction results associated with content auctions in which a given bid was considered; and iteratively adjusting respective values of the rank limit and the power value during auction simulations based on the historical auction data to maximize a performance cost function.

17. The content management system of claim 16, wherein the performance cost function is based on:

a conversion volume change relative to historical data based on scaling a max bid by a bid adjustment value for an auction simulation; and a unit of performance per unit of cost change relative to historical data based on scaling the max bid by the bid adjustment value for the auction simulation.

18. A non-transitory computer readable medium comprising instructions that, when executed by a content management system including one or more servers, cause the content management system to perform operations comprising:

receiving, by the content management system, and from a given user device, a request for content for presentation within a resource currently being presented by the given user device at a given time, the request including data indicating a given device identifier for the given user device, the resource being accessed by the given user device from the Internet;

determining, by the content management system, that the given device identifier is included in a stored list of device identifiers that associates timestamps with device identifiers of user devices, wherein the timestamps specify when the user devices previously visited a particular web page other than the resource currently being presented, the particular web page having been previously provided to the user devices by a publisher system that is different from the content management system;

after the given user device has visited the particular web page and when the given user device presents the resource currently being presented, the resource being different from the particular web page that was visited, determining, by the content management system and based on a difference between (i) the given time at which the request for content for presentation within the resource currently being presented by the given user device was received and (ii) a timestamp that specifies when the given user device that is associated with the given device identifier in the stored list of device identifiers visited the particular web page, an amount of time that has elapsed since a time when the given user device visited the particular web page previously provided to the given user device by the publisher system;

adjusting, by the content management system, a value of a selection criterion that contributes to distribution of specified content to user devices that are referenced by the stored list of device identifiers, including decreasing the value of the selection criterion, thereby decreasing a likelihood that the specified content will be distributed in response to the request based on the amount of time that has elapsed since the time when the given user device visited the particular web page, wherein adjusting the value of the selection criterion comprises (i) accessing data specifying bins associated with the stored list of device identifiers, each bin corresponding to a unique combination of data values related to remarketing content items, and each bin having a corresponding pre-calculated predicted performance measure and bid adjustment value, (ii) selecting only one of the bins based at least in part on a comparison of the data values of the bins to the amount of time that has elapsed since the time when the given user device that is associated with the given device identifier visited the particular web page, and (iii) adjusting the value of the selection criterion that contributes to distribution of the specified content, based at least in part on the bid adjustment value of the selected bin;

selecting, by the content management system, the specified content for the given user device when the adjusted value of the selection criterion for the specified content is higher than selection criterion values of other content items, and selecting different content when the adjusted value of the selection criterion for the specified content is lower than the selection criterion values of other content items; and providing, by the content management system, in response to the request, the selected content to the given user device for presentation within the resource currently being presented by the given user device.

19. The method of claim 11, wherein selecting only one of the bins is based at least in part on a comparison of the data values of the bins to a given device type of the given user device that is associated with the given device identifier.

* * * * *